United States Patent [19]

Haskins

[11] 4,456,799
[45] Jun. 26, 1984

[54] SWITCH CONSTRUCTION FOR TELEPHONE INSTRUMENT

[75] Inventor: Steve W. Haskins, Corinth, Miss.

[73] Assignee: International Telephone and Telegraph Corporation, New York, N.Y.

[21] Appl. No.: 301,832

[22] Filed: Sep. 14, 1981

[51] Int. Cl.³ .................... H01H 21/02; H01H 1/58; H01R 9/12
[52] U.S. Cl. .................. 200/5 R; 179/164; 200/284
[58] Field of Search .............. 200/1 A, 1 TK, 5 R, 200/6 C, 283, DIG. 046, 245-247, 284, 298, 303; 339/95 R, 96, 97, 98, 99 R, 103 M; 179/159, 164

[56] References Cited

U.S. PATENT DOCUMENTS

| | | | |
|---|---|---|---|
| 2,723,327 | 11/1955 | Gilbert | 200/298 |
| 2,742,623 | 4/1956 | Odeguard et al. | 339/97 R |
| 2,912,548 | 11/1959 | Wodal | 200/303 X |
| 3,085,139 | 4/1963 | Wright | 200/283 X |
| 4,265,504 | 5/1981 | Burns | 339/97 R |
| 4,268,726 | 5/1981 | Chu | 200/6 C X |

*Primary Examiner*—J. R. Scott
*Attorney, Agent, or Firm*—John T. O'Halloran

[57] ABSTRACT

A switch assembly adapted especially for use in a pivotal hookswitch mechanism which includes a transverse camshaft acting as a contact operating shaft for a plurality of transversely spaced contact spring operating pairs, each pair having a contact spring in a first and second spaced apart alignment. A housing encloses the shaft and contact springs. The contact springs are leaf springs resting in two parallel arrays of slots in the housing, the springs being identical. The housing is formed of two identical shell members each forming a half of the housing with one half being inverted relative to the other to form the central cavity for the operating components of the mechanism. An insert between spring arrays forces formed sections of the springs of an alignment into insulation piercing engagements with insulated wires during the assembly of the insert to the two housing sections.

8 Claims, 9 Drawing Figures

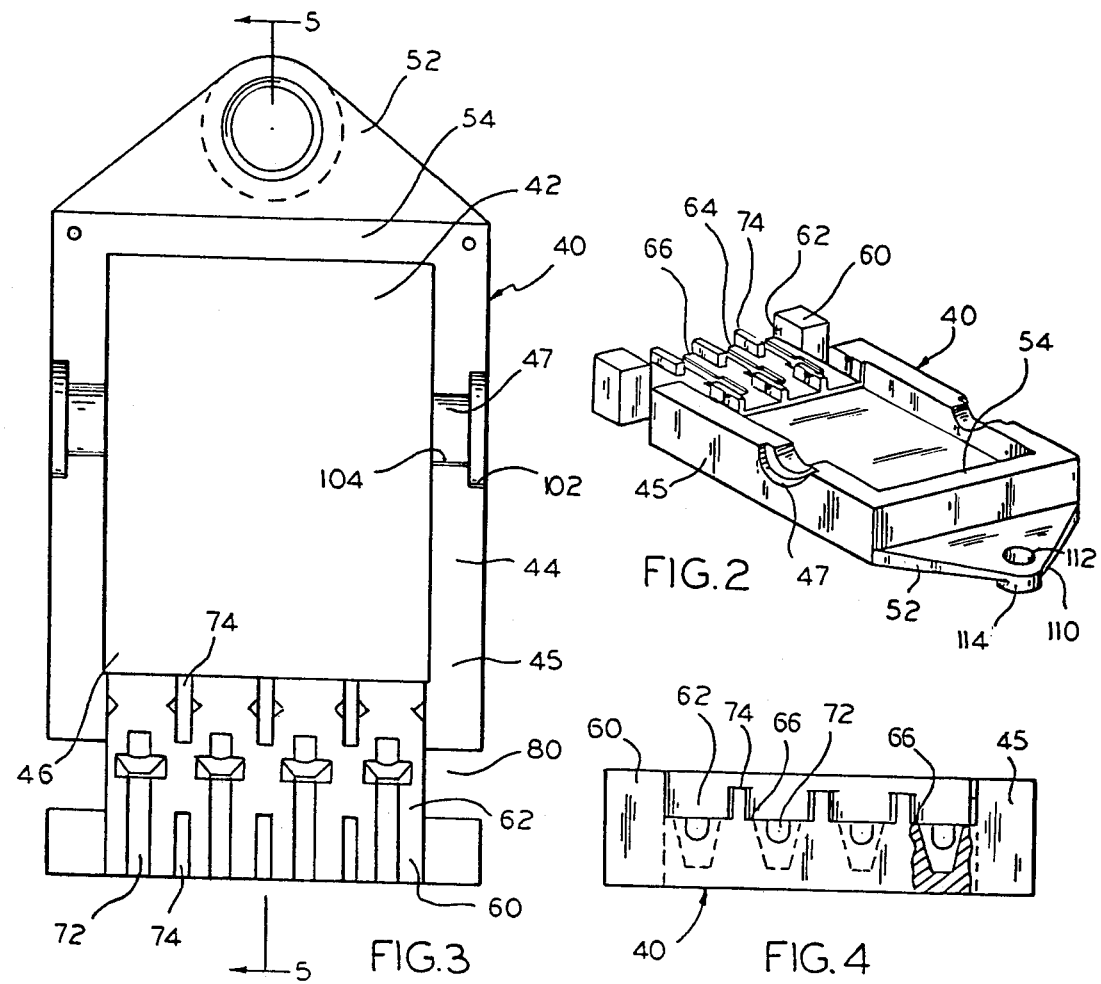

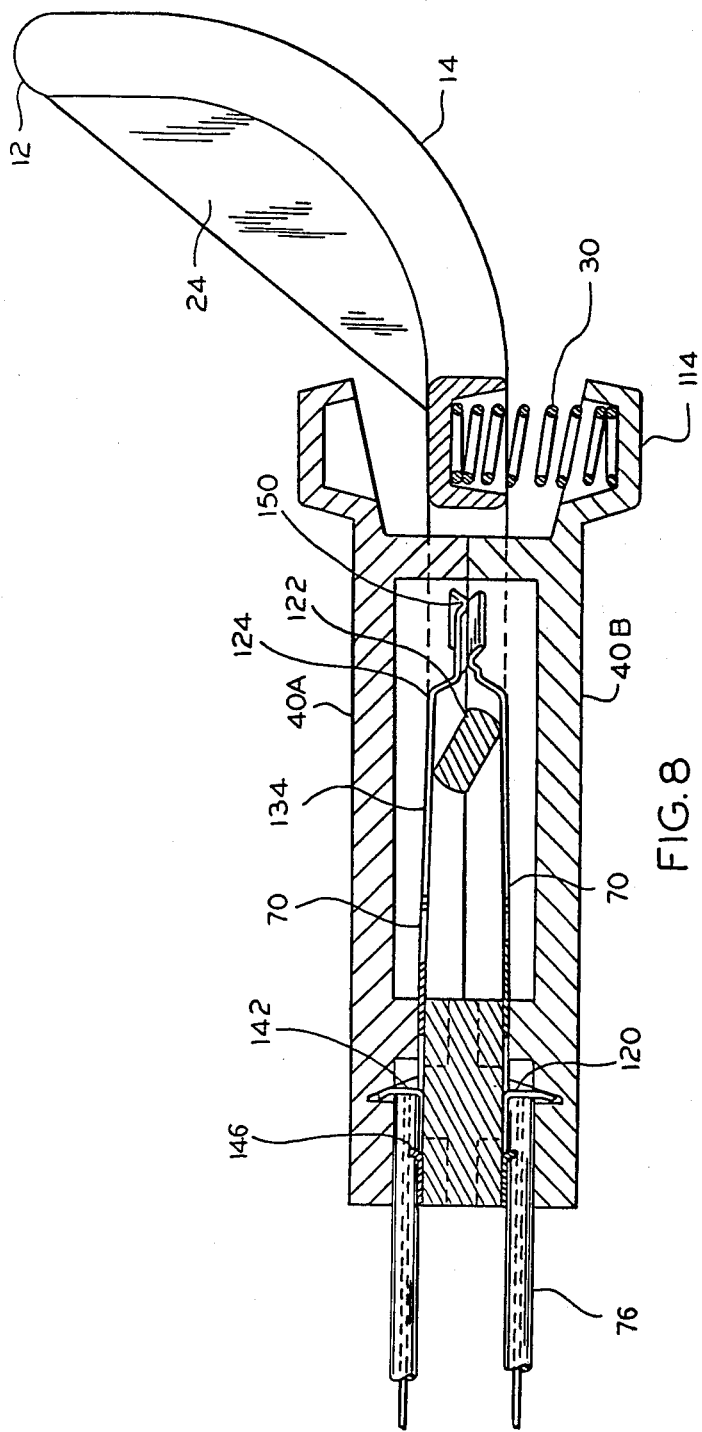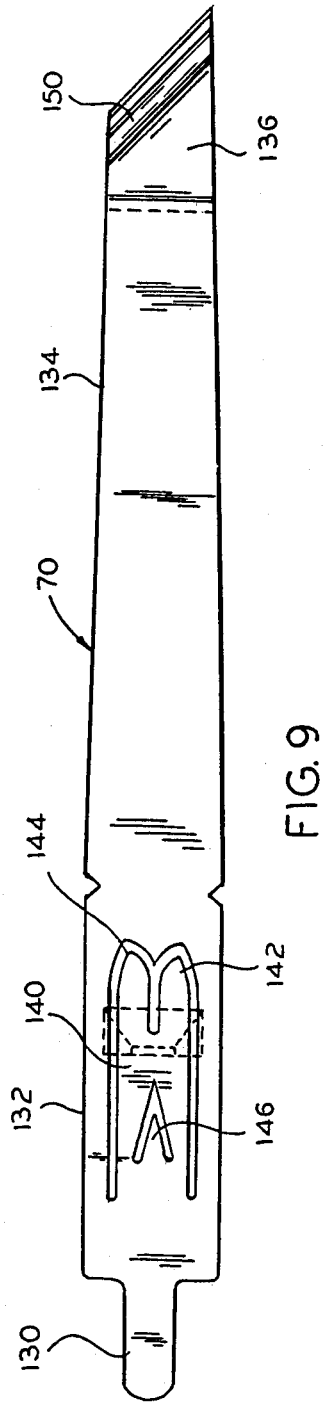

SWITCH CONSTRUCTION FOR TELEPHONE INSTRUMENT

BACKGROUND OF THE INVENTION

Switch assemblies using pairs of cantilevered springs in a spring pileup have been known and used for many years.

As used in the telephone art for relays, cantilever springs clamped into spaced superimposed relationship are conventional. Such contacts springs usually have a contact button weld to the spring for alignment with a contact button on an adjacent spring. A wire is normally wound on the tang end of the wire and soldered in place.

The art of insulation piercing contacts for use in making electrical connections for telephone instruments and terminals is also well-known as for example shown by U.S. Pat. Nos. 4,054,350 to E. C. Hardesty and 3,895,434 to G. F. Adams.

SUMMARY OF THE INVENTION

The present invention is directed to the construction of a switch assembly adapted for use in a telephone using alignments of contact operating springs adapted for use in a telephone hookswitch mechanism or the like. The springs are paired with a cam resting between opposed leaf springs. The leaf springs are identical in configuration.

The cams and springs are enclosed within a split housing formed of two identical halves. In the finished assembly, the housing halves may be suitably bonded or adhered to form a unitary housing which can be replaced if necessary.

The housing halves are identical, one being inverted relative to the other to form the central cavity in which the contact springs are spaced apart transversely. Within a mounting or clamping area, the springs are spaced apart transversely by raised projections. A block insert separates the alignments of contact springs and mates with the raised projections. By the interaction of the insert and the housing clamping area, the contact springs are held firmly in place within the housing.

With the construction shown, the spring contact pileups are assembled with the electrical connection between springs and conductor wires completed automatically by the assembly process.

In the assembly process, the wires of one alignment are placed in individual curved troughs beneath the respective leaf spring channels and the lower alignment of springs are dropped into spring channels to complete the alignment. Each spring has a central formed V section formed into a knee with its free end extending angularly below the spring body. The formed V section has a bifurcated tip at its free end, the tip being positioned above the entry to a tapered vertical socket in the body of the housing base. Each socket intersects a channel and trough. A clamping insert is mated with the base and depressed toward the base. The insert depresses all springs of an alignment together. The bifurcated tip of each spring of the alignment is forced onto the adjacent wire by the pressure exerted by the insert as the bifurcated tips further enter the respective tapered sockets. Each bifurcation pierces the insulation at both of the transverse sides of its wire, engages and contacts the wire conductor. A secondary prong on each contact spring is also depressed by the movement of the insert through the insulation to provide strain relief and a secondary engaging contact between the contact spring and its adjacent wire.

With the insert firmly holding the springs of the lower alignment in contact with the lower set of conductors and firmly to the base, the upper alignment of springs and conductors may be assembled. In one approach, the upper base may be inverted and wires and springs inserted in the same manner as previously described. The partially assembled insert and lower base may then be inverted to mate with the inverted upper base to clamp and connect the springs of the upper alignment with their conductors in the manner previously described. The unit once assembled in this fashion has two alignments of springs spaced apart by an insert which clamps the two housing bases together completing the automatic connection of contact springs to wires in each alignment.

It is therefore an object of the invention to provide a spring pileup construction with two alignments of individually identical contact springs spaced apart, the springs being automatically connected to their respective conductor wires by the assembly of an enclosing housing and clamping insert.

It is a further object of the invention to provide an automatic strain relief connection from contact spring to conductor wire during the assembly process.

It is a further object of the invention to provide plural pairs of spaced contact springs firmly clamped in an enclosing housing aligned in all direction.

BRIEF DESCRIPTION OF THE DRAWINGS

FIG. 2 is a side view in perspective of a housing shell as used herein;

FIG. 3 is a plan view of the shell of FIG. 2;

FIG. 4 is an end view in elevation of the shell of FIG. 3;

FIG. 5 is a sectional view taken along line 5—5 of FIG. 3;

FIG. 6 is a side view in elevation of a pair of contact springs and their actuating cam as used herein;

FIG. 7 is a sectional view of a typical cam as used herein;

FIG. 8 is sectional view through the center of the mechanism of FIG. 1 in its assembled state; and FIG. 9 is a plan view of a typical leaf spring of FIG. 1.

DETAILED DESCRIPTION

Figure 1:
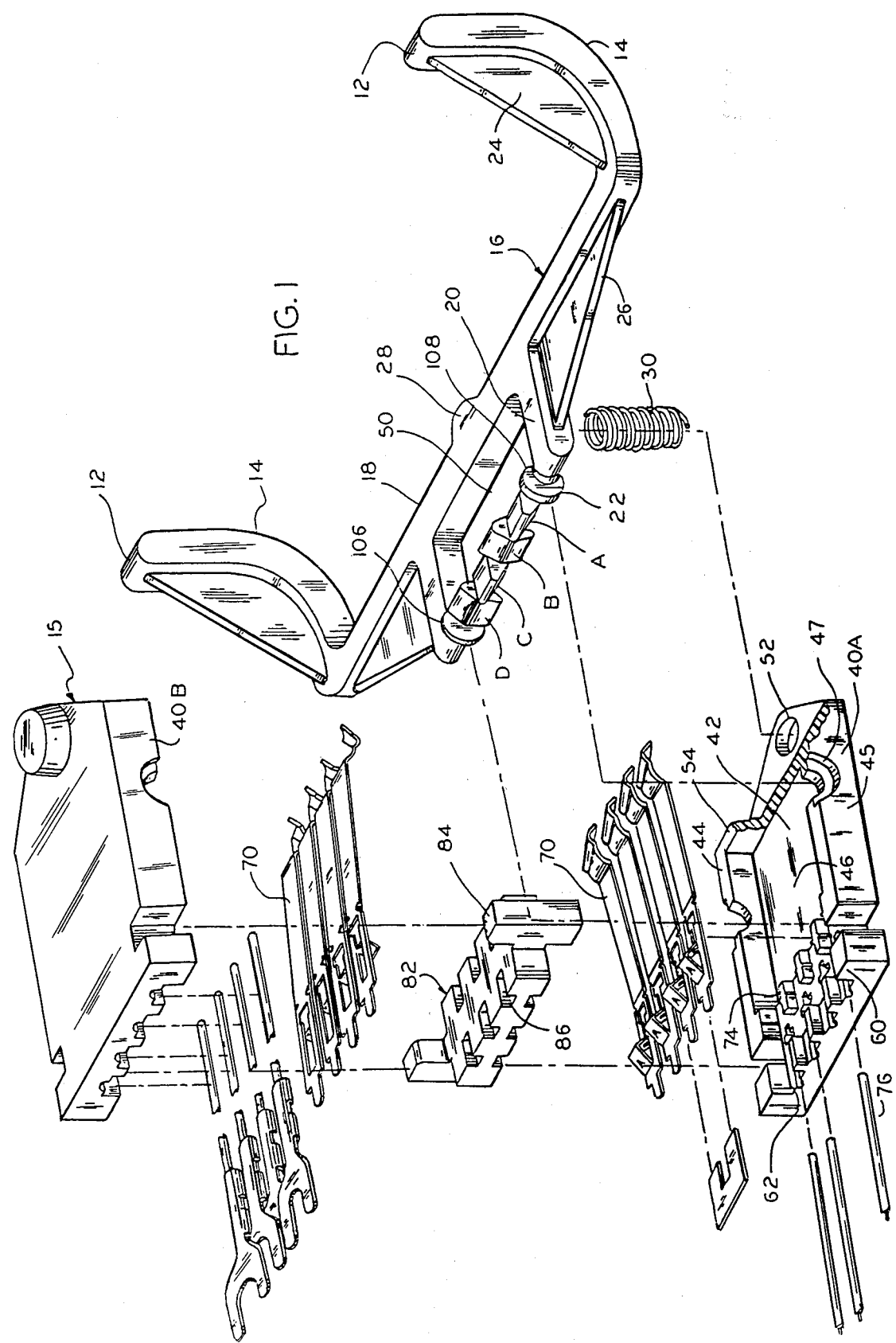
FIG. 1 is an exploded perspective view of a first embodiment of a hookswitch mechanism according to the invention.

In FIG. 1, I show a first embodiment of a hookswitch mechanism for use in a telephone instrument, the mechanism employing the switch construction shown and claimed herein. The mechanism includes an actuating lever 16 and a housing assembly 15, the assembly including the contacts operated responsive to pivoting of the lever 16. The mechanism in one form could be positioned with the tips 12 of the parallel spaced apart actuating arms 14 of lever 16 under the plungers of the well-known 500 type telephone. The parallel actuating arms 14 form the lateral extremities of the actuating lever 16. The arms 14 are curved from the tips 12 to their connection to the cross brace 18. Extending longitudinally from the crossbrace 18 are two support arms 20 for the camshaft 22.

Within the actuating lever 16, there are provided suitable reinforcing webs 24 and 26 extending between members in the respective support planes. In addition, the cross brace 18 has a central semicircular projection 28 which preferably has a blind hole (not shown) in its underside for confining the upper end of compression spring 30.

The actuating lever 16 may be molded as a unit and the camshaft may either be molded as a part of that unit or may be mounted on a shaft fitted into suitable openings (not shown) in support arms 20.

The housing assembly 15 shown in exploded form in FIG. 1 includes a base or shell 40 which forms half of an enclosing housing for the spring array. A base may be molded of suitable insulating material such as thermoplastic material with two identical bases joined together, one inverted relative to the other to form the enclosing housing 43 for receiving and enclosing the spring array. Each base 40 has a generally rectangular surface 42 with walls 44 upstanding about the periphery of the surface to form a central cavity 46 within the walls 44.

A base 40 has semi-circular aligned bearing openings 47 in its transverse sidewalls 45 adapted to receive the camshaft 22 in a completed assembly. With the camshaft resting in the openings 47, the sidewalls 45 are within the spacing between the support arms 20. The base is generally rectangular, with a triangular extension 52 of the main surface 42 at the forward end externally of the front wall 54. As assembled with the lever 16, the extension 52 is spaced a distance from the projection 28 to capture therebetween compression spring 30.

The rear wall 60 of the base 40 is provided with a series of spaced channels 62, the number of channels being the number of spring combinations used. Each channel has an essentially horizontal main surface 64, the surfaces combinedly forming a plane 66 for resting thereon respective sections of leaf springs 70. Each channel 62 has centered thereunder (viewing the lower base) a central semicircular longitudinal trough 72 for receiving a wire for connection to a leaf spring 70 resting on the surface 64 of its channel.

Between the channels 62 of the base, the rear wall has upright discontinuous spacing members 74 adapted to position and separate leaf springs in the plane 66. The troughs 72 serve to hold and align individual insulated wires 76 adjacent the respective leaf springs 70.

On the transverse sides of the base outwardly of the spring mounting area adjacent the rear thereof, both sidewalls 45 have a vertical slot 80 extending fully through the base. The two slots 80 are adapted and sized to receive mounting pillars 84 of the insert 82 in a tight fitting rotation. The insert 82 is used to firmly mount and clamp the springs 70 relative to a base within the housing.

Viewing FIG. 1, the housing 15 includes a lower base 40B and an upper base 40A, base 40A being inverted relative to base 40B. Insert 82 fits between these bases and is assembled onto the lower base 40B with base 40A inverted and assembled to the insert once assembled to base 40B. During the assembly, the upper base 40A is mated with the insert by mating slots 80 with pillars 84. Insert 82 has along its main body an intermediate spring mounting section and at its transverse sides vertical pillars 84 for mating with the slots 80 to fit the insert in the bases to hold the leaf spring contacts in place between both bases 40A and 40B. The insert has longitudinal recesses 86 in both its upper and lower surfaces which mate with the base spacing members 74 to rigidly hold the insert in place in all directions and to secure the upper and lower base together with the leaf springs captive between the insert and the respective bases.

In the structure of FIG. 1, the actuator lever 16 is moved by a switch operator or by plungers (not shown) to rotate the actuator lever 16 with or on the axis of the camshaft. On the camshaft, there are a plurality of laterally spaced cams, each such cam positioned between vertically (as in FIG. 1) spaced leaf springs. Rotation of the camshaft rotates the cams with their highs and lows to either make or break the leaf spring contacts in a desired sequence, as indicated by the cam settings.

FIGS. 2–5 show a typical base 40 in greater detail. In these figures, the general rectangular shape of the base is apparent with its walls 44 forming a raised periphery for the base. The aligned bearing openings 47 incised into the sidewalls 45 are configured of an enlarged diameter external portion 102 and a smaller diameter inner portion 104 both concentric with the bearing opening. The camshaft 22 is configured to mate with the openings 47 (See FIG. 1) with an outer enlarged diameter portion 106 of the camshaft rotating within portion 102 of the housing to shield and effectively seal the inner, lesser diameter bearing 108 of the camshaft mating with portion 104 of the housing to combinedly provide a bearing area which seals the housing cavity from dust and other contaminants.

As seen best in FIGS. 2 and 3, the base 40 has a triangular extension 52 of the main surface 42 which in turn has a tapering cross section narrowing in thickness in the direction of the apex 110 of the extension 28. The extension 28 has a blind bore 112 at its outer end within a circular boss 114 seen best in FIGS. 2, 3 and 5. The blind bore 112 provides a bearing surface for one end of compression spring 30 to restore and maintain the hookswitch in its normal, unactuated condition.

At its rear, the housing has channels 62 separated by spacer members 74, each channel having a longitudinal semi-circular trough 72 incised in it. Each channel has midway along its longitudinal extent a tapering vertical (FIGS. 4 and 5) socket 120 intersecting with its trough, the socket adapted to receive a portion of the spring contact to engage and hold an insulated wire in contact with the contact spring, as will be explained. The socket is tapered both in the longitudinal and lateral directions, for reasons which will be explained.

In FIG. 6, I show a typical cam 122 of camshaft 22 resting between opposed contact springs in its unoperated or closed state, the cam 122 being shown alone in FIG. 7. In FIG. 6, I also show in dashed line form aligned with cam 122, a second cam 124 shown in a position having operated its contacts to an open condition. Each cam has two curved lobes which are asymmetrically disposed to introduce an amount of over travel for wiping action 40 to clear the contacts of possible contaminants. The cams may be molded of suitable insulating material, in one form as part of a one-piece camshaft preferably of material such as reinforced nylon or suitable polyester.

The leaf spring contacts 70 are shown in detail in FIGS. 1, 6, 8 and 9. The springs 70 are all identical, there being shown eight springs shown aligned in four pairs within an assembled mechanism. The spring pairs are spaced with each spring resting in a channel 62, the springs being transversely spaced by the spacers 74 as shown in FIG. 1. Adjacent its contact end, each leaf spring pair has a cam positioned between the springs of the pair to control the operation of the pair on rotation of the cam. Each spring extends from a tang end 130 through a wire connection portion 132 and a cam engaging portion 134 to the contact end 136.

The tang end 130 of each spring in the completed assembly extends past the rear wall 60 of the housing to enable plug-in mounting of the housing assembly into a circuit board or suitable suitable receiving terminal structure (not shown) as an alternative to the connection of conductor wires to the contact springs, as shown. The tang end 130 has reduced transverse width to enable this plug-in capability.

The wire connection portion 132 of a spring includes a pierced portion formed with an inverted V section or a raised knee 140 angled from the spring body with a descending bifurcated tip 142 at the free end of the pierced section. The bifurcation of tip 142 produces a pair of transversely spaced prongs 144 extending angularly beneath the body or main portion 134 of the spring. As assembled or inserted into the base, the burr side of the pierced section faces downwardly to enhance conductor wire piercing action. A triangular pierced depression 146 is fabricated into the rising wall of the knee for a purpose which will be explained further herein. The main spring portion 134 is a flat intermediate portion of the leaf spring which rests in the central cavity of the housing, when assembled (See FIG. 8).

In the connection portion 132 of the spring, V-shaped incisions 162 are made in opposed edges of the spring to mate with vertical ribs 164 extending laterally from the walls of the base spacers 74 to prevent any longitudinal movement of the springs relative to the base once the springs are assembled to the base.

Further, as can be seen in FIG. 1, there may be provided a conducting commoning member 170 which may be inserted between springs of an alignment and the insert to join two adjacent springs electrically, as desired.

The contact end of the spring includes a raised, formed contacting ridge surface 150 at an angle of approximately 45° to the length of the spring. The formed surface is part of a step 152 at the forward end of the spring, the step 152 being raised from the body portion 134 of the spring. This ridge 150 may be suitably plated with contact metal.

As can be understood from FIG. 1, the housing and actuator lever are assembled into a unitary assembly. The assembly would be undertaken by placing one base such as base 40B of FIG. 1 in a cavity up position on a flat surface. Insulated wires 76 are then laid into the troughs 72 extending to the end of the troughs as seen in FIG. 3. Four such wires would be used, one for each channel 62 and its corresponding trough 72. Leaf springs 70 are inserted next. Four leaf springs would be placed in the respective channels, one spring per channel with the spring knee facing upwardly and the prongs 144 facing downward. As a spring is inserted its bifurcated tip 142 is placed within the entrance to a tapered vertical socket 120 as seen in FIG. 5. As mentioned, the burr side of each spring is on the underside of the spring as assembled. The wire connection portion 132 of each spring rests in its respective channel 62 in the rear wall 60 of the base with the spring contact ends resting in the base cavity.

The plastic insert 82 is then moved to the position shown in FIG. 1 above the spring connection area of the lower base 40B and pillars 84 are fitted within the side slots 80 of the housing base. The insert is then lowered in place. The insert 82 is depressed onto the springs and tends to force the bifurcated tips 142 inwardly within their respective vertical sockets 120 to pierce the insulation on the conductors wires 76 and conductively connect the springs to the respective conductor wires. The insert is forced downwardly until pierced section 146 also pierces the insulation and adds a secondary or back-up connection between spring and wire. The section 146 also provides strain relief for the primary electrical connection, while the mating of the tips 142 into sockets 120 aids in restraining the spring contact from movement in the longitudinal direction.

The next step in the assembly is the installation of the compression spring and camshaft to the assembly. The compression spring 30 is fitted in the blind opening 12 of the base 40B. The transverse ends of the camshaft 22 are placed into the bearing openings 47. The cams of the camshaft rest above the respective spring body sections 134.

Preferably, the upper base 40A is then inverted to provide an upwardly open cavity for the insertion of wires and springs to form the upper alignment. The lower assembly is inverted and insert and base 40A are then compressed together.

In this step, the upper set of leaf springs 70 are placed on the inverted base 40A. The cam engaging portions 134 rest under the cams with the bifurcated tips 142 of the springs pointing downwardly. The knee sections 140 rest in the rear recesses 86 of the insert with the bodies of the springs resting on the insert and extending into the cavity to rest on the cams. The upper conductor wires have been positioned in the troughs of housing 40A and the upper housing with assembled insert is lowered onto base 40B. The pressure exerted by the housing 40A as it descends onto the insert acts to seat the wires into channels and force the bifurcated tips 142 to pierce the wire insulation and connect each wire to a leaf spring. The housings may thereafter be suitably adhered together by adhesive or heat or the like. Thus, the leaf springs are insulated from the springs in the same alignment by the base spacers 74 and from the other spring of the pairing by the insert and by the cam.

As viewed in FIG. 1, cams A and C maintain two spring contacts in the closed position shown by FIG. 8 and two cams B hold their contacts in the open position. By setting of each cam in its own individual angular orientation relative to a radial base plane relative to the camshaft, sequencing of the spring operations can be obtained.

I claim:

1. A switch mechanism comprising a first and a second identical leaf spring with one of said springs inverted relative to the other spring to place a contact making member of one spring in position to engage a like member on the other spring, an insulating housing for mounting said springs in said position, said housing including a base portion for gripping each spring in an intermediate mounting portion thereof, each said base portion including: an elongated channel for receiving the spring therein, an elongated trough in said channel for receiving an insulating wire in said trough adjacent said spring and parallel thereto, a socket transversely across said channel and trough and extending to a base of said socket further into said base portion than said channel and trough; each said spring including a cantilevered section within said mounting portion, said section including an insulation piercing segment adapted to fit into said socket, and means for compressing said segment to drive said piercing segment and into the wire and toward the base of said socket whereby to pierce the insulation of the wire and place said leaf spring in conductive contact with the conductor of a wire in said trough.

2. A mechanism as claimed in claim 1, in which said compressing means includes an insert adapted to be positioned between said base portions, and in which each cantilevered spring section comprises a raised knee directed toward said insert and a toe end of said section including said insulation piercing segment, said insert including opposed walls for engaging the knee of the spring directed thereagainst for driving each said section toe end into said socket on insertion of the insert between the base sections.

3. A mechanism as claimed in claim 2, in which the toe end of each of said cantilevered sections comprises a pair of spaced bifurcated tips, the walls on the socket of each base section tapered to confine the tips into converging paths during the driving of both toe end into the respective sockets to pierce the wire insulation and place the tips of each leaf spring in electrical contact with the wire in the respective troughs.

4. A switch structure for a first and a second parallel alignment of generally planar leaf springs including means to hold said springs in opposed contact making and breaking pairs and in which the springs of each pair are identical, a first insulating housing on one side of the first alignment and a second insulating housing on the far side of the second alignment with each housing being identical, each housing having a plurality of parallel channels in one face of the housing for holding the leaf springs with one spring in each channel, a trough in each channel holding an insulated wire adjacent the leaf spring in the channel, a socket within each channel extending into the housing past the trough and intersecting the channel and trough, an intermediate portion of each spring including a flexed member angled from the plane of the spring and extending into the socket of the respective channel, said flexed member including a tip resting in said socket, and an insulating common clamping member mounted between the alignments of leaf springs to insulate the springs of one alignment from the springs of the other alignment, said clamping member including opposed walls impinging on the respective alignments of springs to clamp said springs in said housing and to drive the tips into the respective sockets and into the insulated wire whereby to pierce the insulation of the wire and force the flexed member of each spring in conductive contact with the adjacent wire.

5. A switch structure as claimed in claim 4, in which the tip of each flexed member comprises a pair of bifurcated prongs, the prongs driven toward one another by the cooperative action of the clamping member and the tapering walls of the socket into which the tip is located to pierce the insulation in said bifurcation and to position the bifurcation in contact with the wire adjacent the pierced insulation.

6. A switch structure as claimed in claim 5, in which each said flexed member comprises a knee portion upstanding from the planar spring into engagement with a wall of the clamping member and said bifurcated prongs extending angularly from the knee past the plane of the spring with the flex member integrally hinged to said spring.

7. A switch structure as claimed in claim 6, in which each said spring includes adjacent the hinged section a barb for penetrating insulation of the adjacent wire and contact the wire within the insulation to provide a secondary contact between the spring and the adjacent wire.

8. An assembly for terminating an insulated conductor wire with a generally planar leaf spring, and comprising an insulating terminal block including an elongated channel for receiving therein a leaf spring, an elongated depression aligned in the channel for receiving therein an insulated wire parellel to and adjacent to said leaf spring, said leaf spring including an intermediate section of the spring formed with a knee raised from the plane of the spring on the side away from the channel, an extension of said spring from said knee extending angularly from the plane of said spring toward said depression, and an insulating insert adapted to mate with said terminal block and hold said spring in said channel between the insert and block, a wall on said insert positioned to contact said knee and force the knee toward the plane of the spring during assembly of the insert to the block whereby to force the extension of the spring into insulation piercing contact with the insulation of the wire and form an electrical contact between the spring and the wire.

* * * * *